United States Patent
Bjoernsen et al.

(10) Patent No.: US 9,111,253 B2
(45) Date of Patent: Aug. 18, 2015

(54) GROUPWARE TIME TRACKING

(75) Inventors: Christian G. Bjoernsen, San Carlos, CA (US); Nir Kol, Sunnyvale, CA (US); Frederic E. Samson, Palo Alto, CA (US); Iryna Vogler-Ivashchanka, Los Altos, CA (US); Dana Cohen Bar-On, Kfar Saba (IL); Eric Wood, Menlo Park, CA (US)

(73) Assignee: SAP SE, Walldorf (DE)

( * ) Notice: Subject to any disclaimer, the term of this patent is extended or adjusted under 35 U.S.C. 154(b) by 1411 days.

(21) Appl. No.: 11/408,844

(22) Filed: Apr. 20, 2006

(65) Prior Publication Data

US 2006/0277544 A1     Dec. 7, 2006

Related U.S. Application Data

(60) Provisional application No. 60/673,814, filed on Apr. 22, 2005.

(51) Int. Cl.
    *G06Q 30/04*     (2012.01)
    *G06Q 10/00*     (2012.01)
    *G06Q 10/10*     (2012.01)
    *G06Q 10/06*     (2012.01)

(52) U.S. Cl.
    CPC ............... *G06Q 10/10* (2013.01); *G06Q 10/06* (2013.01); *G06Q 10/107* (2013.01)

(58) Field of Classification Search
CPC ....... G06Q 30/02; G06Q 10/10; G06Q 10/06; G06Q 30/06; G06Q 30/0601; G06Q 10/06395; G06Q 10/063; G06Q 10/0639; G06Q 10/06393
See application file for complete search history.

(56) References Cited

U.S. PATENT DOCUMENTS

| | | | |
|---|---|---|---|
| 4,862,357 A | 8/1989 | Ahlstrom et al. | 364/407 |
| 5,021,953 A | 6/1991 | Webber et al. | 364/407 |
| 5,237,499 A | 8/1993 | Garback | 364/407 |
| 5,331,546 A | 7/1994 | Webber et al. | 364/407 |
| 5,404,488 A | 4/1995 | Kerrigan et al. | |
| 5,477,447 A | 12/1995 | Luciw et al. | |
| 5,749,079 A | 5/1998 | Yong et al. | |
| 5,754,782 A | 5/1998 | Masada | |
| 5,864,848 A | 1/1999 | Horvitz et al. | |

(Continued)

FOREIGN PATENT DOCUMENTS

| | | |
|---|---|---|
| EP | 1460538 | 1/2004 |
| WO | WO 2004/021185 A2 | 3/2004 |
| WO | WO 2004/021185 A3 | 3/2004 |

OTHER PUBLICATIONS

Heck, M. (1996). Project pulls groups together. InfoWorld, 18(23), 109. Retrieved from http://search.proquest.com/docview/194322580?accountid=14753.*

(Continued)

*Primary Examiner* — Justin M Pats
*Assistant Examiner* — Nancy Prasad

(57) ABSTRACT

Embodiments of the present invention provide methods and apparatuses enabling groupware to track time associated with a workflow task. A workflow object representing a workflow task is provided. The workflow object is associating with a time period, a project code, and an identifier of a groupware client user participating in the workflow task. In response to an event indicating completion of the workflow task, the time period, the project code, and the identifier is automatically transmitted to a backend application.

20 Claims, 13 Drawing Sheets

(56) References Cited

U.S. PATENT DOCUMENTS

| | | | |
|---|---|---|---|
| 5,946,464 A * | 8/1999 | Kito et al. | 709/202 |
| 5,948,040 A | 9/1999 | DeLorme et al. | 701/201 |
| 6,009,408 A | 12/1999 | Buchanan | 705/11 |
| 6,026,410 A | 2/2000 | Allen et al. | |
| 6,085,201 A | 7/2000 | Tso | |
| 6,119,095 A | 9/2000 | Morita | 705/5 |
| 6,209,018 B1 | 3/2001 | Ben-Shachar et al. | |
| 6,442,526 B1 | 8/2002 | Vance et al. | 705/5 |
| 6,622,147 B1 | 9/2003 | Smiga et al. | |
| 6,632,251 B1 | 10/2003 | Rutten et al. | |
| 6,732,080 B1 | 5/2004 | Blants | 705/9 |
| 6,801,226 B1 | 10/2004 | Daughtrey | 345/763 |
| 7,020,618 B1 * | 3/2006 | Ward | 705/2 |
| 7,050,986 B1 | 5/2006 | Vance et al. | |
| 7,080,021 B1 | 7/2006 | McCulloch | |
| 7,100,195 B1 | 8/2006 | Underwood | |
| 7,167,919 B2 | 1/2007 | Iwamoto et al. | |
| 7,305,381 B1 | 12/2007 | Poppink et al. | |
| 7,310,646 B2 | 12/2007 | Rangadass et al. | |
| 7,343,302 B2 | 3/2008 | Aratow et al. | |
| 7,707,057 B2 * | 4/2010 | Ward | 705/2 |
| 7,853,959 B2 * | 12/2010 | Agassi et al. | 719/319 |
| 7,895,588 B2 * | 2/2011 | Rossmann | 717/162 |
| 7,996,855 B2 * | 8/2011 | Heist et al. | 719/330 |
| 8,042,153 B2 * | 10/2011 | Feng et al. | 726/2 |
| 2001/0034736 A1 | 10/2001 | Eylon et al. | |
| 2002/0077842 A1 * | 6/2002 | Charisius et al. | 705/1 |
| 2002/0184402 A1 | 12/2002 | Gangopadhyay | |
| 2003/0120526 A1 | 6/2003 | Altman et al. | |
| 2003/0144892 A1 | 7/2003 | Cowan et al. | |
| 2003/0229511 A1 * | 12/2003 | Edmondson et al. | 705/1 |
| 2004/0044987 A1 | 3/2004 | Kompalli et al. | |
| 2004/0059789 A1 * | 3/2004 | Shum | 709/206 |
| 2004/0083195 A1 | 4/2004 | McCord et al. | |
| 2004/0122835 A1 | 6/2004 | McKibben et al. | |
| 2004/0143723 A1 | 7/2004 | Acker et al. | |
| 2004/0148299 A1 | 7/2004 | Teegan et al. | |
| 2004/0215635 A1 * | 10/2004 | Chang et al. | 707/100 |
| 2005/0010819 A1 | 1/2005 | Williams et al. | |
| 2005/0171963 A1 | 8/2005 | Barrett | |
| 2005/0209904 A1 | 9/2005 | Hayashi | |
| 2006/0136530 A1 * | 6/2006 | Rossmann | 707/206 |
| 2006/0167735 A1 * | 7/2006 | Ward | 705/8 |
| 2006/0265393 A1 * | 11/2006 | Agassi et al. | 707/10 |
| 2007/0043574 A1 * | 2/2007 | Coffman et al. | 704/275 |
| 2007/0055703 A1 * | 3/2007 | Zimran et al. | 707/200 |
| 2007/0088702 A1 * | 4/2007 | Fridella et al. | 707/10 |
| 2007/0094110 A1 * | 4/2007 | McCrea | 705/32 |
| 2008/0126486 A1 * | 5/2008 | Heist et al. | 709/205 |
| 2008/0127189 A1 * | 5/2008 | Braun et al. | 718/102 |
| 2009/0178105 A1 * | 7/2009 | Feng et al. | 726/1 |
| 2012/0066061 A1 * | 3/2012 | Clement | 705/14.49 |
| 2012/0116880 A1 * | 5/2012 | Patel et al. | 705/14.54 |

OTHER PUBLICATIONS

Non-Final Office Action mailed Oct. 29, 2008 for U.S. Appl. No. 11/312,435.

Final Office Action mailed Nov. 19, 2009 for U.S. Appl. No. 11/408,845, 13 Pages.

Final Office Action mailed Dec. 9, 2009 for U.S. Appl. No. 11/409,379,, 23 Pages.

Advisory Action for U.S. Appl. No. 11/408,845 Mailed Feb. 16, 2010, 5 Pages.

EP Application No. 06 724 504.3-2221; EP communication dated Mar. 4, 2008.

Final Office Action mailed May 9, 2008 for pending U.S. Appl. No. 11/312,435.

Dan Woods, "Packaged Composite Applications: A Liberating Force for the User Interface", internet document, Oct. 2003, p. 1-4, XP-002349437.

Non-Final Office Action for U.S. Appl. No. 11/408,845 dated May 19, 2009; 33 pages.

Kum-Yew Lai et al., "Object Lens: A 'Spreadsheet' for Cooperative Work", ACM Transactions on Office Information Systems, vol. 6, No. 4, Oct. 1988, pp. 332-353, XP-002333144.

International Application No. PCT/EP2006/001110 Int'l Preliminary Report on Patentability dated Aug. 23, 2007.

Non-Final Office Action for U.S. Appl. No. 11/409,379, Mailed Aug. 5, 2009, 48 pages.

Non-Final Office Action for U.S. Appl. No. 11/350,294, Mailed Sep. 16, 2009, 36 Pages.

International Search Report and Written Opinion, PCT Application No. PCT/EP2006/003706, filed Apr. 21, 2006, mailed Aug. 22, 2006, 11 pages.

International Search Report and Written Opinion, PCT Application No. PCT/EP2006/003708, filed Apr. 21, 2006, mailed Aug. 22, 2006, 12 pages.

Final Office Action for U.S. Appl. No. 11/350,294, Mailed Mar. 4, 2010, 21 Pages.

Restriction Requirement for U.S. Appl. No. 11/409,378, Mailed Mar. 30, 2010, 8 Pages.

Non-Final Office Action for U.S. Appl. No. 11/409,379, Mailed May 10, 2010, 31 Pages.

Non-Final Office Action for U.S. Appl. No. 11/409,378, Mailed May 24, 2010, 27 Pages.

Non-Final Office Action for U.S. Appl. No. 11/408,845, Mailed Jun. 24, 2010, 9 Pages.

Notice of Allowance for U.S. Appl. No. 11/350,294, Mailed Sep. 2, 2010, 20 pages.

"Microsoft Computer Dictionary" 2002, Microsoft Press, Fifth Edition p. 499., referenced word/definition—storage media, (2002), 1 page.

Non-Final Office Action for U.S. Appl. No. 11/409,378, Mailed Oct. 19, 2010, 9 pages.

Notice of Allowance and Fees for U.S. Appl. No. 11/409,379, Mailed Nov. 30, 2010, 20 Pages.

Final Office Action for U.S. Appl. No. 11/408,845, Mailed Nov. 23, 2010, 13 Pages.

Notice of Allowance and Fees for U.S. Appl. No. 11/409,378, Mailed Dec. 17, 2010, 5 Pages.

"Seven Tasks to Get Started With Microsoft Exchange", Windows IT Pro, InstantDoc #2702, Sep. 1996, www.windowsitpro.com, 19 pages, XP-002333125.

Anonymous, "Business Add-Ins", internet document, Jul. 24, 2002, p. 1-15, XP-002296620.

John Clarkson, "Creating Add-Ins in Microsoft Excel 97", internet document, Apr. 1999, p. 1-3, XP-002296622.

Anind K. Dey et al., "CyberDesk: A Framework for Providing Self-Integrating Context-Aware Services", 1998 International Conference on Intelligent User Interfaces, New York, New York, Jan. 6, 1998, p. 47-54, XP-002155976.

International Search Report and Written Opinion, PCT Application No. PCT/EP2006/001110, filed Feb. 8, 2006, mailed Apr. 6, 2006, 11 pages.

* cited by examiner

GROUPWARE TIME TRACKING

RELATED APPLICATIONS

The present application claims the benefit of priority under 35 U.S.C. §119(e) and incorporates by reference in its entirety U.S. Provisional Application No. 60/673,814, filed on Apr. 22, 2005. The present application is also related to co-pending U.S. application Ser. No. 11/350,294, filed on Feb. 7, 2006.

FIELD

Embodiments of the invention relate to business process workflow management, and more particularly to time tracking using groupware.

BACKGROUND

A workflow generally refers to a flow of tasks associated with a business process. The tasks may be structured and/or ad hoc. A task may include one or more actions or activities (a series of actions). The business process typically involves people (sometimes referred to as participants of the workflow), organizational roles (e.g. manager, employee, etc), and documents, including records.

Some workflows are supported by computers that provide mechanisms for modeling, executing, and/or controlling the workflow. A user interacts with these mechanisms through a user interface (UI), typically a graphical user interface (GUI). A GUI is a graphical interface to a computing system that displays visual elements, e.g. icons and windows, on a display, e.g. a monitor. GUIs, as well as other user interfaces, may include non-visual interfaces, such as an audio interface, making the interface accessible to a wide variety of people.

Enterprises increasingly rely on computers to execute or help execute workflow tasks. Traditionally, to execute workflow tasks, multiple, unrelated desktop applications have been involved. For example, an employee may be assigned a task through an email application. The task may be chargeable to a client based on a time-dependent rate (e.g. hourly). To track the time spent on completing the task, the employee may use a separate computer application (e.g. a word processing application or spreadsheet application), or a physically separate device (e.g. a handheld device or a paper notepad). After the task is complete, the employee then uses another application or device to record and submit to the enterprise's accounting department the total time spent on the task, often in a specific format.

Using multiple, independent applications can be not only time-consuming, but can also result in security/access issues. For example, one or more of the applications used to execute the task may be inadequately designed to provide the security/access control necessary to protect enterprise data involved in the workflow. Therefore, one or more applications that a workflow participant uses with regularity may be less secure and/or less capable of dealing with enterprise business process tasks. Additionally, manual transfer of the data from one application (or device) to another to complete the task also exposes the integrity of the enterprise data to unnecessary risks. Furthermore, using multiple, independent applications makes it difficult for the enterprise to use the computing system to assist workflow participants in complying with procedures and policies set forth by the enterprise to complete a workflow.

SUMMARY

The invention provides a method for tracking time associated with a workflow task including providing in a groupware client a workflow object representing a workflow task; associating with the workflow object a time period, a project code, and an identifier of a groupware client user participating in the workflow task; and in response to an event indicating completion of the workflow task, automatically transmitting to a backend application the time period, the project code, and the identifier.

The method may further include calculating the time period based on input indicating a start time and an end time.

The event may occur when a current time is equal to the end time and the method may further include comparing the current time with the end time.

The event may occur when a graphical user interface tool in the groupware client is selected and the method may further include receiving input indicating selection of the tool.

The method may further include receiving from the backend application a summary of time periods associated with the project code or the identifier; and presenting the summary in the groupware client.

The method may further include providing a list of project codes based on the identifier; and enabling the user to select the project code from the list.

The method may further include enabling the user to search for the project code.

Providing the workflow object may include providing the workflow object to a potential participant of the workflow task.

The invention also provides a machine readable medium having instructions which when executed by a processor cause the processor to perform operations including transmitting to a first groupware client a workflow object representing a workflow task, the workflow object created in a second groupware client and associated with a start time, an end time, and a project code designated by an organizer of the workflow task; receiving from the first groupware client a response to the transmitting; relaying the response to the second groupware client; and when the response includes an acceptance of participation in the workflow task, automatically creating in the first groupware client a calendar entry based on the start time and the end time.

The operations may further include receiving a designation of a second project code; and associating the second project code with the workflow object.

Receiving the designation may include receiving the designation from the first groupware client, and the operations may further include: associating the second project code with the workflow object and an identifier of a user of the first groupware client.

The workflow object may be selected from the group consisting of: a calendar object, an email object, a task list object, and a contacts object.

The invention further provides a device for processing time associated with a workflow task including: a groupware interface to receive, from a groupware client, a request to change a property of a workflow object representing a workflow task, the workflow object associated with a time, a project code, and one or more user identifiers; and a backend application, connected to the groupware interface, including: a reporting module to determine if the property was incorporated into an external report; a storage interface to transmit the property to a storage system in response to the request if the property was not incorporated into the external report; and a notification module to transmit an error message to the groupware client in response to the request if the property was incorporated into the external report.

The external report may include an invoice.

The reporting module may include an internal reporting module connected to the groupware interface to generate an internal report summarizing times associated with the project code or associated with at least one of the one or more user identifiers.

The reporting module may include an external reporting module connected to an external system to generate the external report based on the time, the project code, and the one or more user identifiers.

The backend application may further include an alert module to transmit to one or more groupware clients an alert based on the time, the alert relating to compliance with a time tracking policy.

The backend application may further include a validation module connected to the groupware interface and a database to receive project codes from the groupware client via the groupware interface and to determine validity of the project codes based on data stored in the database.

The backend application may further include: a default module to provide a default project code to associate with the workflow object, the default project code based on at least one of: the workflow task, the time, and the one or more user identifiers.

The backend application may further include: a default module to provide a default time to associate with the workflow object, the default time based on at least one of: the workflow task, the project code, the one or more user identifiers, and a status of a project assigned to the project code.

BRIEF DESCRIPTION OF THE DRAWINGS

The following description includes discussion of various figures having illustrations given by way of example of implementations of embodiments of the invention. The drawings should be understood by way of example, and not by way of limitation.

FIG. 1b is a block diagram of one particular aspect of components shown in FIG. 1a;

FIG. 2 is a flow diagram of time tracking using the components shown in FIG. 1a;

DETAILED DESCRIPTION

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein.

Figure 1A:
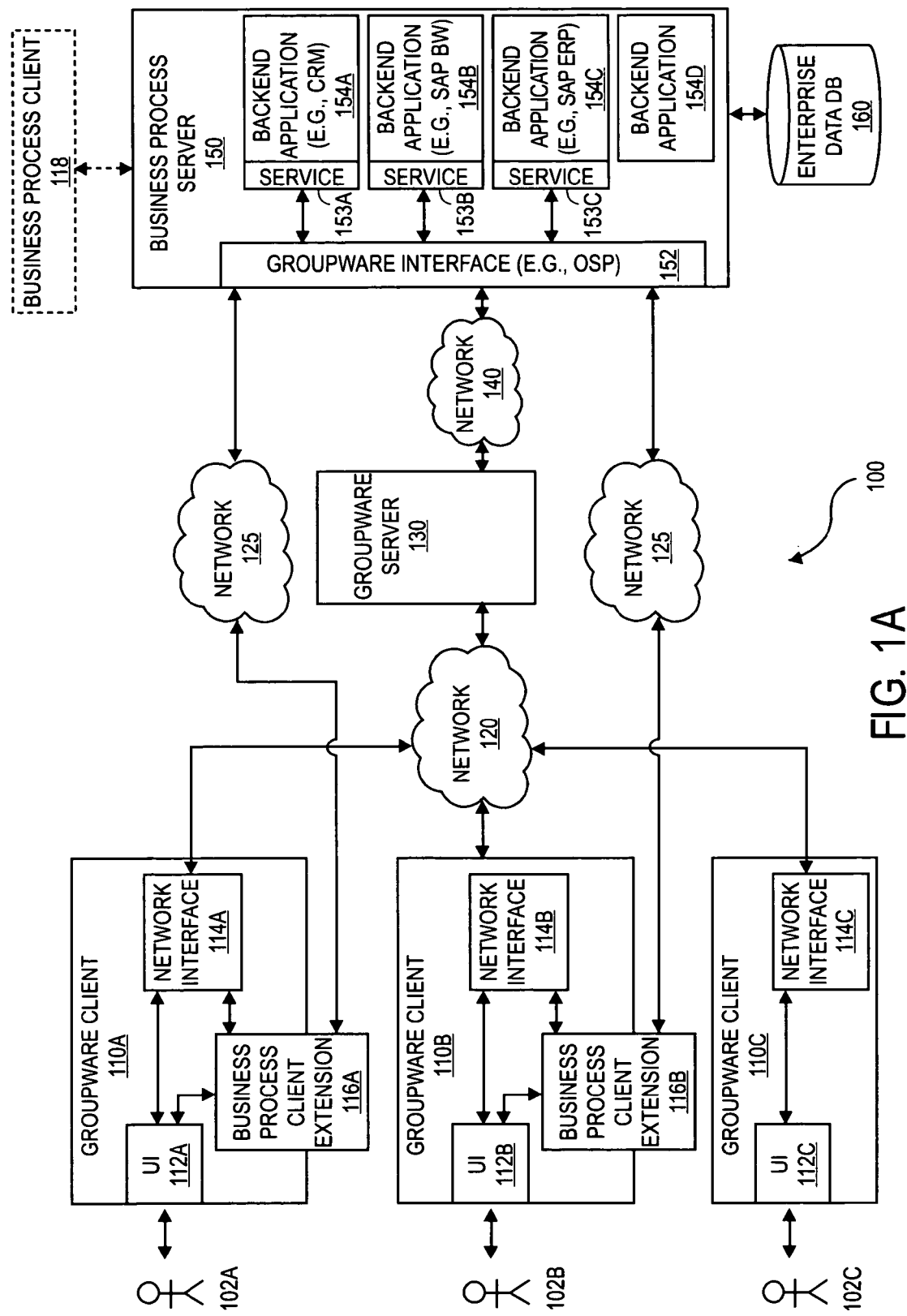
FIG. 1a is a block diagram of a network scheme implementing one embodiment of this invention.

FIG. 1a illustrates a network scheme 100 in accordance with one embodiment of this invention. The network scheme 100 includes groupware clients (e.g., 110A, 110B, and 110C), one or more networks (e.g. the networks 120, 125, and 140), a groupware server 130, a business process server 150, an enterprise data database 160, and an optional business process client 118.

A "backend" (or "back-end") is the component of a computing entity which processes input from a front end. In FIG. 1a, the backend includes the groupware server 130, the business process server 150, and the enterprise data database 160. A "frontend" (or "front end") is the component of a computing entity which directly interfaces with a user. A graphical user interface (GUI) is an example of a frontend. In FIG. 1a, each groupware client includes a frontend. In some instances, the entire client is deemed the frontend.

Each groupware client includes a user interface (e.g. 112A, 112B, or 112C) and a network interface (e.g. 114A, 114B, and 114C). Groupware clients 110A and 110B each also include a business process client extension (e.g. 116A and 116B).

The business process server 150 includes a groupware interface 152, services 153A, 153B, and 153C, and backend applications 154A, 154B, 154C, and 154D. Backend applications 154A, 154B, and 154C are accessible to the groupware clients and/or groupware server via the groupware interface 152 and a respective service (e.g. 153A). The backend application 154D is not directly accessible to the groupware clients and/or groupware server via the groupware interface 152, but is used by one or more of the other backend applications. For example, in FIG. 1a, the backend application 154D allows the other backend applications (e.g. 154A) to access the database 160. The database 160 stores enterprise data, including confidential information, e.g. personnel records and timesheets.

A backend application (e.g. 154A, 154B, 154C, or 154D) includes, for example, a customer relationship management (CRM) application, a data warehouse solution (e.g. the SAP® Business Information Warehouse (BW)), a management information system (e.g. the SAP® Enterprise Resource Planning System (ERP)), or other business process applications which provides services to a client (e.g. the business process client 118 or the groupware client 110A via the groupware interface 152).

Figure 9:
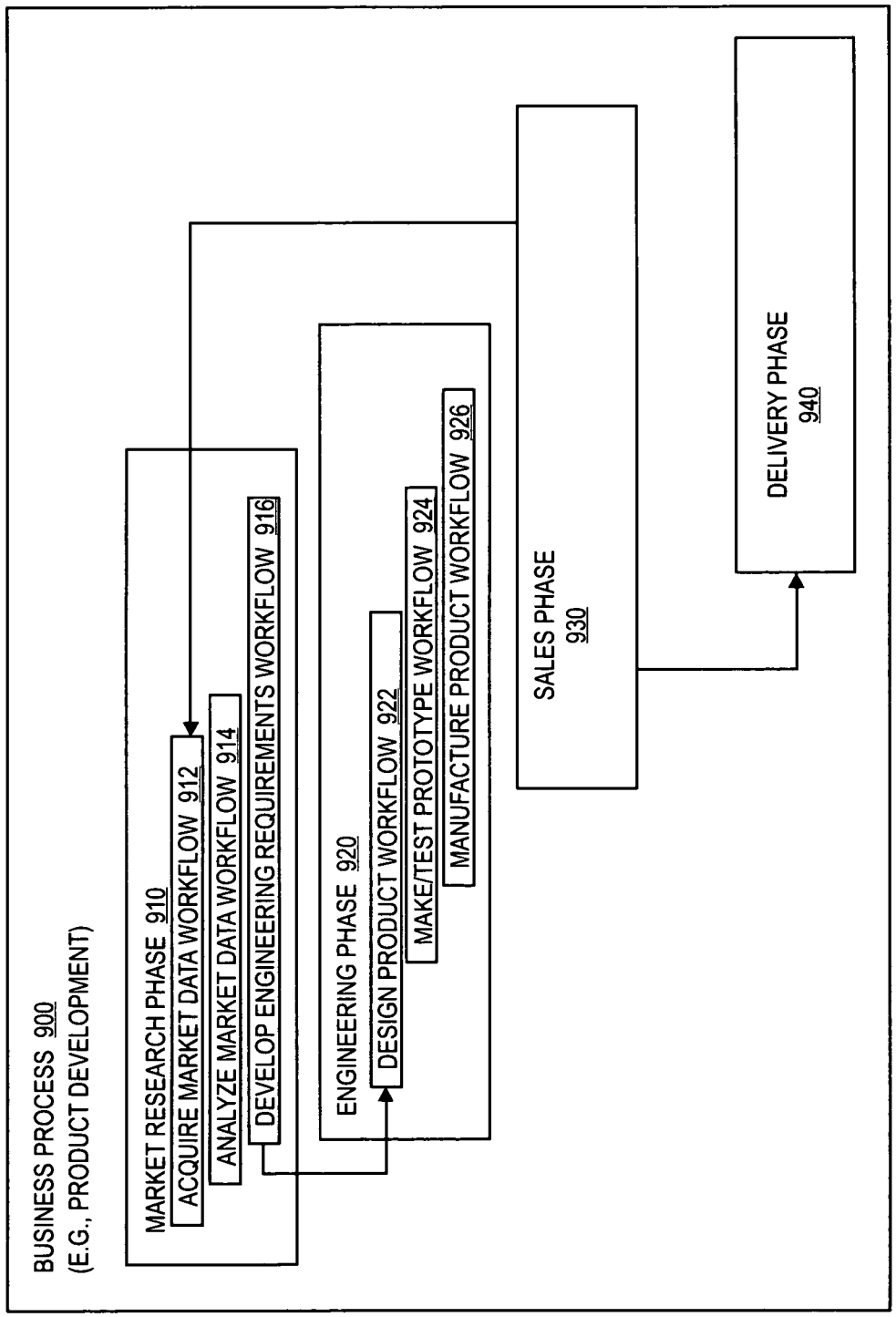
FIG. 9 is a block diagram of an illustrative business process.

As used herein, a "business process" refers to a process used to perform work within an enterprise. FIG. 9 illustrates an example of a business process. In FIG. 9, the business process 900 is the development of a product. The business process 900 includes multiple phases, including a market research phase 910, an engineering phase 920, a sales phase 930, and a delivery phase 940.

Each phase includes one or more workflows. For example, the market research phase 910 includes three workflows: a workflow 912 to acquire market data, a workflow 914 to analyze the market data, and a workflow 916 to develop engineering requirements based on the analysis performed in the workflow 914. A workflow may include context in terms of organizational roles of participants, as well as documents, forms, and other data.

Each workflow includes one ore more structured and/or ad hoc tasks. Each task is executed and/or performed to progress towards the end-goal of the business process. For example, the workflow 912 may involve the tasks of surveying end-users of the product, contacting a market research firm for data, and gathering data on competitor products.

Each task involves one or more actions. For example, contacting the market research firm may involve making a phone call. Surveying end-users of the product may involve gathering end-user contact information, developing a survey, and executing the survey.

Accordingly, each workflow involves one or more individuals (e.g. the users 102A-102C in FIG. 1a). Each individual involved in a workflow is responsible for ensuring the workflow is completed and/or is responsible for performing the workflow task(s). For example, one individual (e.g. 102A) may be involved in making a phone call to contact a market research firm. A team of workflow participants may be involved in gathering data on competitor products, searching the web for product literature, and ordering products, while another participant, e.g. a supervisor of the team, is responsible for ensuring the tasks are complete. An individual may become involved in a workflow only after certain conditions arise, e.g. when a cost of completing a task exceeds a budgeted amount.

In some business processes, the phases are non-sequential. For example, in some product development business processes, the sales phase 930 begins before the engineering phase 920 is complete.

Additionally, in some business processes, the phases are not independent. Events in one phase may affect activity in another phase. For example, in one business process, although the engineering phase 920 has begun, new market data (perhaps obtained during the sale phase 930) changes the requirements of the product, thereby affecting an engineering phase workflow, e.g. a workflow 922 to design the product.

Completion of a workflow often includes collaboration between many individuals. To facilitate completion of the workflow, the present invention provides groupware. As used herein, "groupware" refers to any of a type of collaborative software, for example, email software, whiteboard software, spreadsheet software, etc. Groupware is typically associated with client(s) and server(s). A groupware event is an event which is organized using groupware. A groupware event typically involves multiple workflow participants, e.g. by being collaborative (e.g. a meeting) or being a delegated task.

In FIG. 1a, users (e.g. 102A, 102B, and 102C) collaboratively participate in a workflow using groupware clients and the groupware server. Each groupware client (e.g. 110A) is connected to the groupware server 130 via a network 120.

A groupware server (e.g. 130) is hardware and/or software that provides centralized services accessible to one or more groupware clients (e.g. 110A-110C). For example, a groupware server such as the Microsoft® Exchange Server provides centralized email delivery and filtering services accessible to one or more groupware clients, e.g. Microsoft® Outlook clients. Accordingly, the groupware server includes one or more network interfaces (not shown) to provide the services to the clients.

Each groupware client includes programs, routines, etc., that allows interaction with the groupware server 130. The programs, routines, etc. interact with the groupware server via a network interface (e.g. the network interface 114A in the client 110A).

Specific instances of client-to-server interaction may be initiated by a user (e.g. the user 102A). For example, in one use, the user 102A, using the UI 112A, composes and submits an email (or other groupware object described herein) destined for another user (e.g. 102B). The groupware client 110A transmits the email (or other groupware object) to the groupware server 130 via the network interface 114A. The groupware server 130 processes the email and transmits it to the groupware client 110B, via the network interface 114B. The groupware client 110B is associated with the user 102B, e.g. in response to the user 102B logging into the groupware client 110B.

In FIG. 1a, the groupware server 130 (e.g. the Microsoft® Exchange Server) is also connected to the business process server 150 (e.g. an SAP® server), e.g. via a network 140. The business process server 150 is hardware and/or software and includes components used to manage and/or assist in the execution of a business process. For example, in one implementation, a business process server component, such as the backend CRM application 154A (and its respective service 153A), is used to track current or potential customers acquired during the sales phase 930 of the business process 900. In one implementation, a backend accounting application is used to generate and track invoices to customers.

Accordingly, in use, a groupware client 110A (e.g. a Microsoft® Outlook client) transmits information (e.g. a charge) to the groupware server 130 (e.g. a Microsoft® Exchange Server). The information is transmitted using a groupware object, e.g. a generic email object or a groupware object specifically designed to interact with the business process server. The groupware server 130 then transmits at least part of the information, in some instances after further processing, to the business process server 150 (e.g. an SAP® server).

Business process server extensions (e.g. 116A and 116B) enable the groupware client (e.g. 110A) to communicate with the business process server 150, with or without first communicating with the groupware server. The extensions provided to the groupware client enable integration of business process tasks into the environment of the groupware client. Accordingly, a workflow participant (e.g. user 102A) can interact, e.g., create, process, track, set preferences, etc., with a workflow through the user interface of the groupware client. The user interface (e.g. 112A) of a groupware client is likely to be familiar to the workflow participant, and allow the integration of tools of the groupware client (e.g., spellchecking, translations, etc.) into the performance of the workflow task.

With extensions, a workflow participant accesses and interacts with workflows that are otherwise accessible only via an independent client, e.g. the business process client 118. The integration of access to business process tasks enables the workflow participant to act on contextual information (e.g., reports, documents, hints, data, etc.) locally from within a groupware application. The participant is able to generate a workflow, receive status or other information regarding one or more tasks of a workflow, and/or process or execute a task of a workflow.

The groupware client accesses data objects, forms, functions, services, data structures, and/or processes that exist or are managed in the business process server 150 and the enterprise data database 160. Status information, for example, is provided to the groupware client to provide updated information for the business process within the groupware client. Status information is also accessible when the workflow participant selects an item/icon or executes an action within the groupware client.

In contrast to the integrated use of groupware with a workflow as described herein, current email notifications or other traditional functions of groupware focus only on a single task or action with respect to the workflow. With the integration of groupware functionality and enterprise access, the business process information associated with a workflow presented in the groupware application is persisted with the integrated groupware client. Persisting the information refers to making the information available to the workflow participant either continuously, or upon request, and from within the context of the groupware client. Persisting the information may include storing the information locally to the groupware client, or within a storage location within a groupware server, in addition to storing the information within the enterprise backend.

Figure 1B:
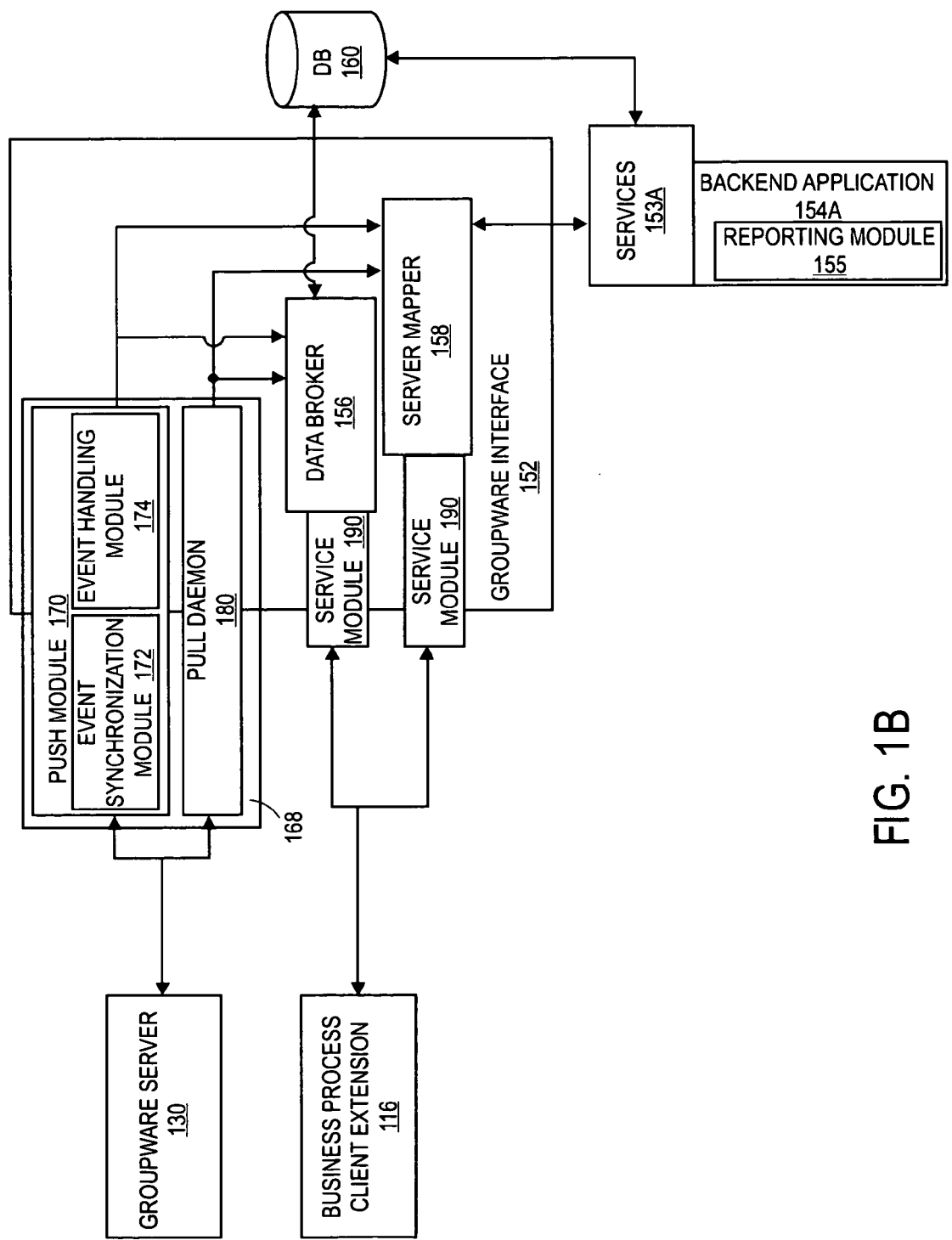

FIG. 1b illustrates components used in interactions between the groupware and the business process server. In FIG. 1b, the groupware interface includes a groupware server interface 168, a data broker 156, a service mapper 158, and service modules 190.

The groupware server interface 168 includes a push module 170 and/or a pull daemon 180. The push module 170 includes an event synchronization module 172 and an event handling module 174. The push module enables the groupware interface 152 to push information to the groupware server 130 based on an occurrence of an event. The pull daemon 180 enables the groupware interface 152 to pull information from the groupware server 130. In one implementation, the groupware server interface 168 is a Java® interface. The groupware server interface 168 is connected to the data broker 156 and the service mapper 158.

The data broker 156 is connected to the database 160 and provides access to data stored in the database 160. The service mapper 158 maps services available in the business process server, e.g. the service 153A. The service 153A provides access to functions and routines of the backend application 154A. The backend application 154A (or another backend application in the business process server 150) may include a reporting module 155 to generate a report based on information processed by the backend application and stored in the database 160. The data broker 156 and the service mapper 158 in the business process server are also accessible via the service module 190.

A groupware client uses the business process client extension 116 to access the groupware interface. In one instance, the groupware client uses the business process client extension 116 to communicate to the groupware server, and then access the groupware interface 152 via the groupware server interface 168. In another instance, the groupware client uses the business process client extension 116 to communicate to the service module 190 to access the groupware interface 152, thereby bypassing the groupware server 130. In one implementation, the service module 190 is a web service module and the business process client extension 116 communicates with the service module 190 using a protocol, e.g. HyperText Transfer Protocol (HTTP).

Figure 2:
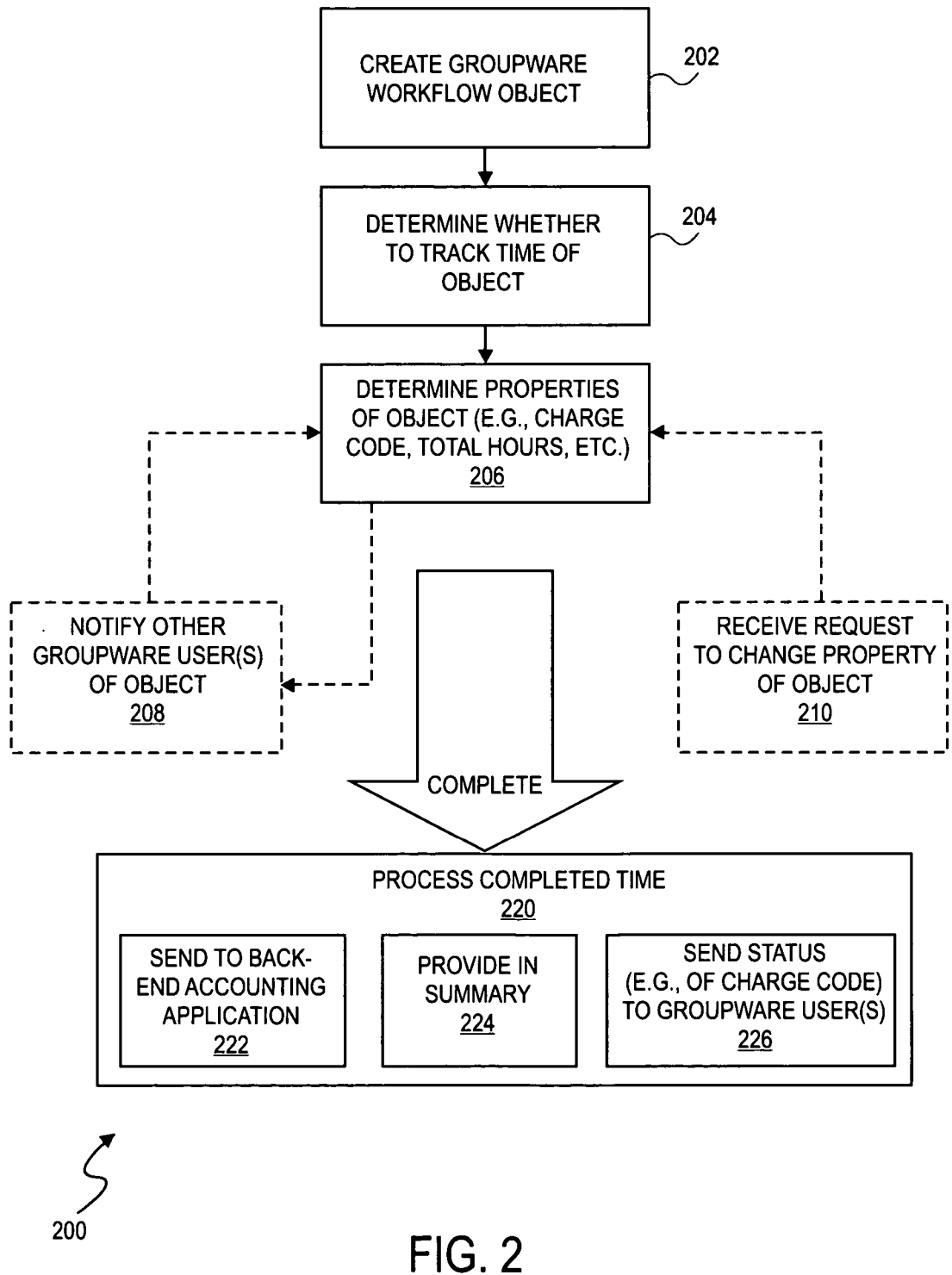

Using one or more of the components shown in FIGS. 1a and 1b described above, groupware time tracking is achieved. FIG. 2 is a flow diagram 200 of time tracking using the components discussed above.

At 202, a groupware workflow object is created. A workflow object is any object which contains information associated with a workflow. The workflow object typically represents a task in the workflow, e.g. by identifying an action to be completed in order to further the progress of the workflow. A groupware workflow object is any workflow object which is transmitted to and from groupware components (e.g. the groupware client and the groupware server).

A groupware workflow object may be or include, for example, an email object, a calendar object, a task list object, a contacts object. The email object identifies individuals associated with a workflow (e.g. in the To, From, Cc, or Bcc field) and may describe actions to be taken or record workflow tasks which are completed.

The calendar object may include, for example, an appointment object, an event object, and a reminder object. The calendar object also identifies individuals associated with a workflow task. For example, an appointment object may identify individuals invited to a meeting, as well as an organizer of the meeting. Accordingly, the groupware workflow object created at 202 may be a calendar object, specifically an appointment object, representing the workflow task, such as a meeting to discuss engineering requirements as part of the workflow 916.

At 204, a determination is made whether to track time associated with the object. In use, this determination is made based on user input (e.g. via selection of a graphical user interface tool) or on a stored preference (e.g. a default setting for certain categories of workflow objects).

At 206, one or more properties of the time-tracked object are determined. These properties are then associated with the time-tracked workflow object, e.g. in the groupware client, the groupware server, a backend application, and/or the database 160. The property may include, for example, a code to which to charge the time, e.g. an account number and/or a project code. The property may also include an identifier of a user of the groupware client, e.g. an employee identification number. In use, the identifier is determined when the user (e.g. 102A) logs into the groupware client (e.g. 110A) and is automatically associated with the workflow object when the user creates the workflow object at 202 using the groupware client (e.g. 110A). In certain implementations, this user identifier determines at least one of: a client to charge for the time associated with the workflow object (e.g. a time period of the meeting), a billing rate, and a supervisor who approves of the time prior to billing the client.

In the example described herein, the properties of the workflow object include a time period associated with the workflow object. In one implementation, when the workflow object is a calendar object, a component of the scheme 100 (e.g. the groupware client 110A, the groupware server, or a backend application) calculates the time period associated with the workflow object based on a start time (e.g. a time inputted as when the meeting is to start) and an end time (e.g. a time inputted as when the meeting will end). Determining the properties of the time-tracked object may occur before or after the workflow task associated with the object has started. For example, in one configuration, the time period calculated based on the start time and end time is not determined until after the end time has passed.

At 208, other groupware users are notified of the object if appropriate. For example, when the object is an appointment object for a meeting, an organizer of the appointment may invite other groupware users to the meeting. The groupware server 130 may notify users identified by the organizer of the workflow object by sending the other users an email inviting them to the meeting or by placing a calendar object in each user's email inboxes, for example. The system is configured to allow an invited user to reject the invitation, thereby altering a property of the object (e.g. the identity of the participants of the workflow task), as represented by the dotted arrow from operation 208 to operation 206.

At 210, a request to change a property of the object is received, e.g. from the organizer or one or more of the invitees. The change may be, for example, a change a location or length of the meeting. Like a rejection of an invitation by an invitee, this request changes the properties of the object, as represented by the dotted arrow from operation 210 to operation 206. If changes are made to a property of the workflow object, the system may be configured to notify other groupware users of the change, including workflow participants associated with the workflow, but who are not actively involved in the executing the task (e.g. a supervisor who will not attend the meeting).

At 220, the task represented by the workflow object is complete and the system processes the completed time. An event typically indicates completion of the workflow task.

In one configuration, the event occurs when a current time is equal to a time associated with the workflow object, e.g. the end time of the meeting. For example, the groupware client, the groupware server, and/or the business process server compares the current time with the end time. When the current time is later than the end time, the groupware client, the groupware server, and/or the business process server calls a function indicating that an event indicating completion of the workflow task has occurred (e.g. the meeting has ended). In response to the event, the time period (e.g. the total time of the meeting), the project code, and the identifier of the user (e.g. a workflow participant who attended the meeting) is automatically transmitted to the backend application for processing, e.g. at 220.

In one configuration, the event indicating completion of the workflow task occurs when a graphical user interface tool in the groupware client is selected. For example, the user 102A changes a status associated with the workflow object, e.g. by altering a flag, or selecting a checkbox. The groupware client, the groupware server, and/or the business process server receives input indicating selection of the tool. In response to the event, the time period, the project code, and the identifier of the user is transmitted to the backend application for processing.

In one configuration, the groupware client and/or the groupware server processes the completed time by communicating (at 222) via the groupware interface 152, the total time spent at the meeting to a backend accounting application. At 224, the backend application provides a summary, such as a total time spent or total amount charged for the task, workflow, or business process to-date.

In one implementation, the summary is provided to one or more of the groupware clients for presentation to a groupware user. For example, in one use, the groupware client and/or groupware server receives from the backend application a summary of time periods associated with the project code or the identifier. The groupware client and/or groupware server (via the groupware client) presents the summary in the groupware client, as described in more detail below.

In one configuration, the summary is generated by the reporting module 155. The reporting module 155 includes an internal reporting module connected to the groupware interface to generate an internal report summarizing times associated with the project code or associated with at least one of the one or more user identifiers. The reporting module also includes an external reporting module connected to an external system to generate an external report based on the time, the project code, and the one or more user identifiers. The external report may include, for example, an invoice, e.g. to a customer associated with the project code. Accordingly, in one configuration, the reporting module is able to determine if a property of a workflow object, e.g. a time period associated with the object, was already incorporated into an external report (e.g. already included in calculating an invoice).

At 226, the status of the business process, phase, or workflow is sent to one or more of the groupware user(s). The status may affect other tasks in the workflow, such as when another task is to start or when another task must be completed to remain on schedule.

Figure 3:
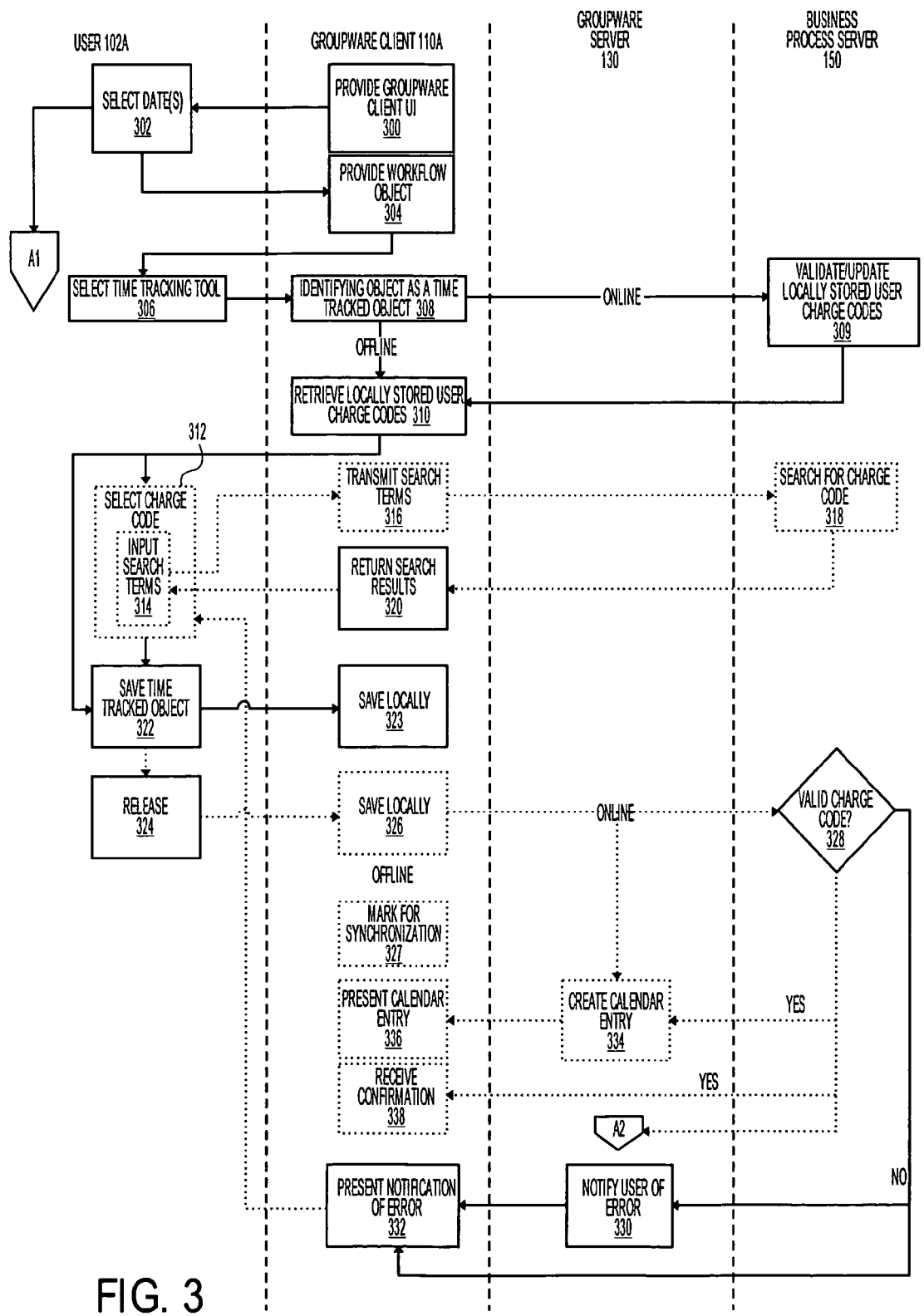
FIG. 3 is a flow diagram of operations in accordance with FIG. 2.
Figure 4A:
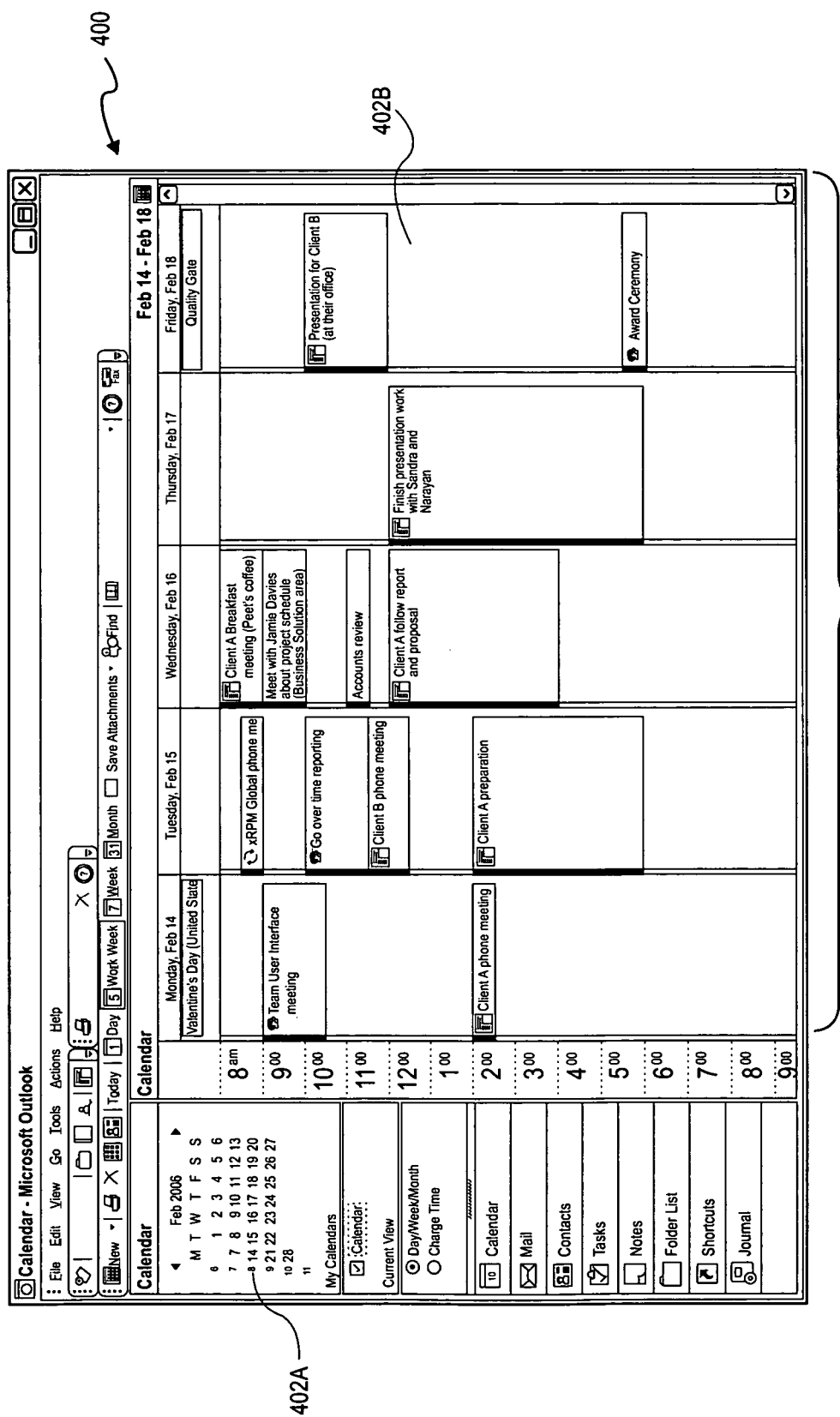
FIGS. 4a-4c are representations of a user interface in accordance with FIG. 3.
Figure 4B:
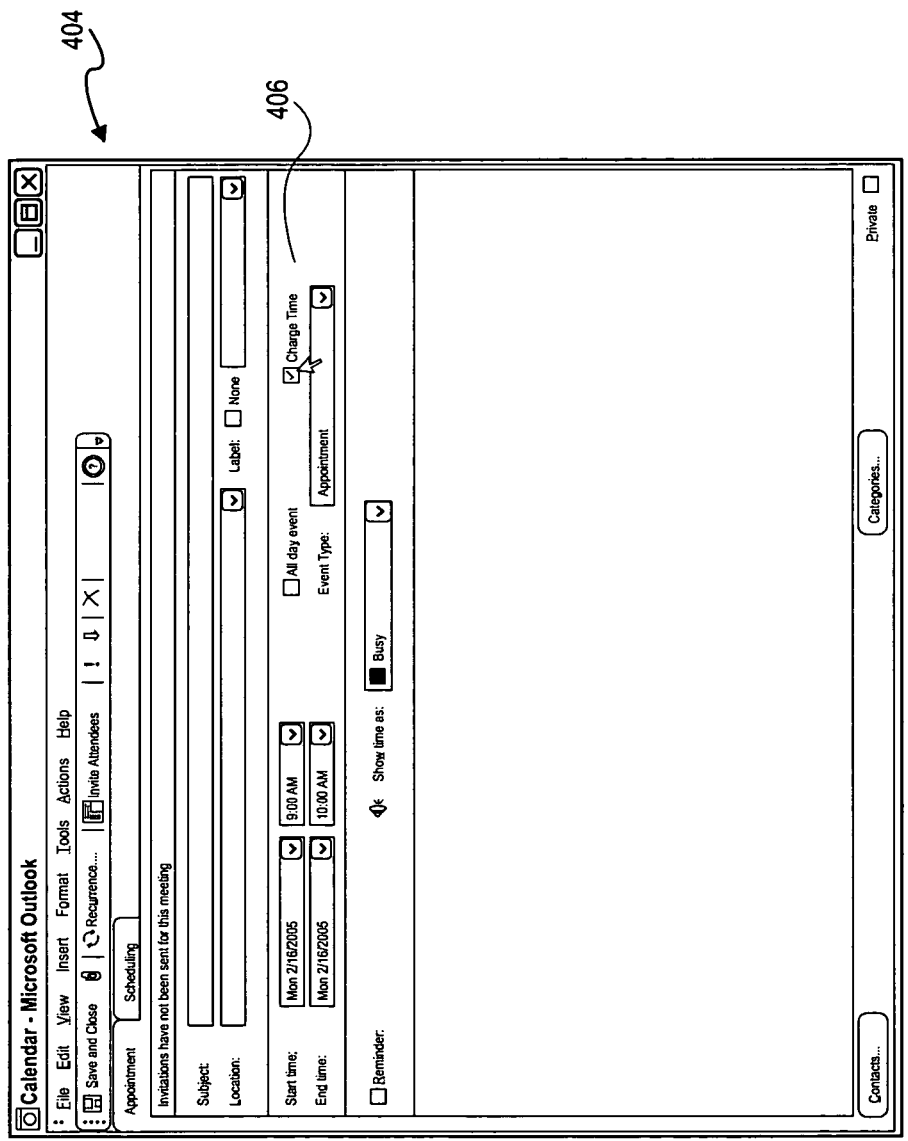
Figure 4C:
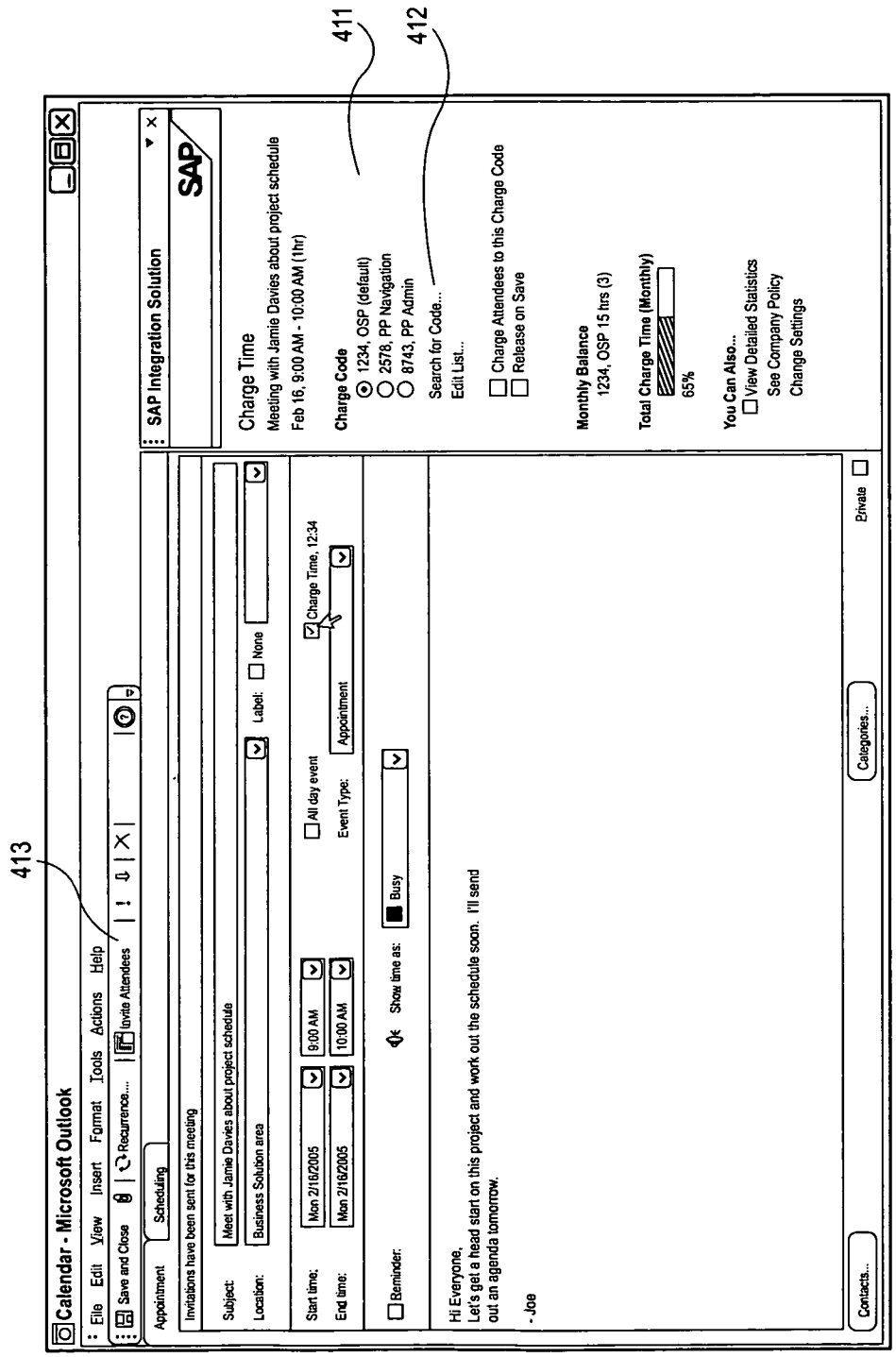
Figure 5:
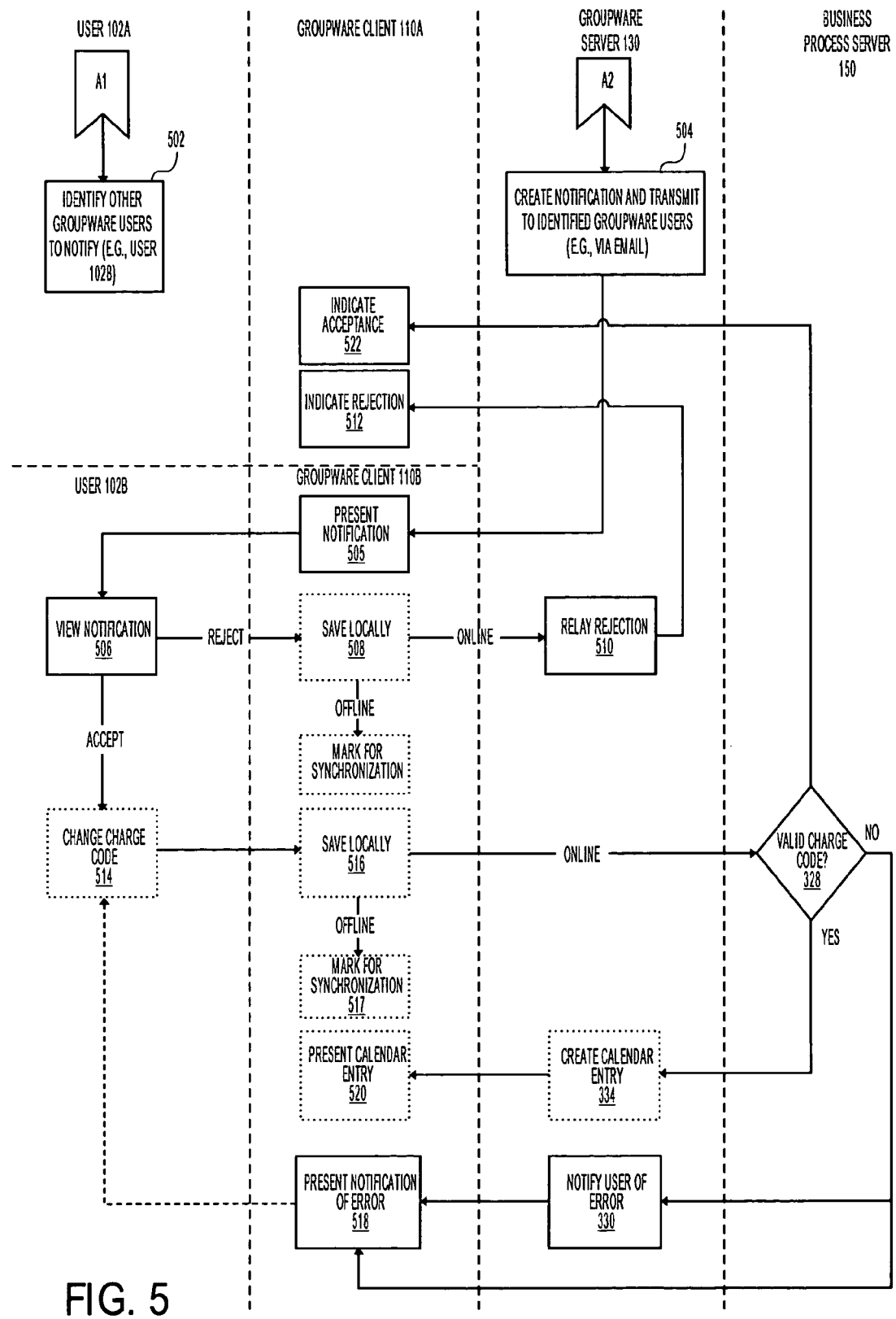
FIG. 5 is a flow diagram of additional operations in accordance with FIG. 2.

FIGS. 3-8 provide additional details regarding the groupware time tracking shown in FIG. 2. FIGS. 3 and 4A-C provide details regarding creation of the workflow object (202), determination of whether to track time associated with the object (204), and determining properties of the object (206). FIGS. 5 and 6A-B provide further details regarding notifying other groupware users of the object (208) and determining properties of the workflow object (206) when the workflow object is associated with more than one groupware client user.

In FIG. 3, at 300, the groupware client (e.g. 110A) provides a groupware client user interface (UI). The UI may be a graphical user interface (GUI) such as the GUI 400 shown in FIG. 4A. The groupware client provides tools via the user interface enabling the groupware client user to collaborate with other groupware users and interact with backend applications (e.g. 154D).

At 302, a groupware client user (e.g. 102A) uses the tools in the groupware client user interface to create a workflow object. In this illustrative example, the user selects one or more date(s) to create a calendar object. For example, the user may select the dates shown in the month element 402A of FIG. 4A. As another example, the user may select a date by double-clicking on a date region 402B of a week element 402C of FIG. 4A. In response to the selection, the groupware client 110A provides a workflow object, e.g. a calendar object.

FIG. 4B shows one manner in which the groupware client 110A provides the workflow object to the user 102A. In FIG. 4B, a calendar object, specifically an appointment object (sometimes referred to as a meeting object), is visually presented as a GUI 404.

At 306, provided with the workflow object, the user selects a time tracking tool to indicate a desire to track time associated with the workflow object. For example, in FIG. 4B, the user selects a "Charge Time" checkbox 406.

At 308, in response to selection of the time tracking tool, the groupware client 110A identifies the workflow object as a time tracked object. A time tracked object is a workflow object which will be associated with a time (e.g. a time period). Typically, the time tracked object is also be associated with a project code and an identifier of a groupware client user, e.g. a user who created the workflow object, a user who selected the time tracking tool, or a user who is otherwise associated with the workflow object (e.g. by being invited to attend the meeting). Because groupware users typically log into a groupware client to access features of the client, the client has ready access to a user's identifier.

If the groupware client is online (e.g. has network access to the groupware server and/or the business process server), the groupware client 110A communicates with the business process server 150 to validate and/or update locally stored charge codes at 309. The charge code is any identifier with which charges to an entity (e.g. another enterprise or a customer) are associated. For example, the charge code may be a project code, a client code, or an account number.

In FIG. 3, the charge codes are user charge codes. That is, the charge codes are specifically associated with the user provided with the workflow object, and not with another groupware client user. This configuration prevents the user from charging time to a code for which the user is not authorized to charge. The groupware client, groupware server and/or business process server provides a list of charge codes based on the user's identifier.

If the groupware client is offline (e.g. does not have network access to the groupware server and/or the business process server), the groupware client 110A retrieves charge codes from a local storage device (e.g. memory, a harddrive, a cache, etc).

FIG. 4C shows examples of a presentation 411 to the user of available charge codes. In FIG. 4C, the charge codes provided in response to selection of the time tracking tool include a default charge code "1234, OSP (default)" which is automatically selected. This default code may be automatically determined by the groupware client based on, for example, the most recently selected charged code, the most frequently selected charge code, a default value set by the user, or a default value set by the enterprise. Accordingly, embodiments of the invention enable time associated with a workflow object, and therefore time associated with a workflow task, to be assigned to a default code. In one configuration, a backend application in the business process server includes a default module to provide a default project code to associate with a workflow object. The default project code based on at least one of: the workflow task, the time associated with the workflow object, and the one or more user identifiers. The time associated with the workflow object may include a date associated with the object. For example, based on the time/date associated with the workflow object, the default module may determine that the user is scheduled to work on a certain project. Using this information, the default module determines a default project code to associate the workflow object.

In one configuration, the default module provides a default time to associate with the workflow object. In one implementation, the default time is based on at least one of: the workflow task, the project code, the one or more user identifiers, and a status of a project assigned to the project code.

In FIG. 3, the charge code is selected by the user at 312. The groupware client enables the user to select the charge code (e.g. a project code) from the list of charge codes determined based on the user's identifier.

In FIG. 4C, only one charge code is selected, although more than one is available. In one configuration, the groupware client enables the user to select more than one charge code, thereby effectively enabling the user to charge the time associated with the workflow object to more than one code (e.g. more than one client or project).

FIG. 4C also shows a tool 412 enabling the user to search for a charge code. Using the tool 412, the user inputs search terms at 314, which are received by the groupware client and transmitted to the business process server (via the groupware interface 152). Based on the search terms, a backend application (e.g. 154D) searches for a charge code. In use, the user enters a search term, e.g. "new customer name." Using the business process client extension 116A, the groupware client transmits (directly or indirectly) the search term in an appropriate format to the business process server. The business process server transmits the results of the search back to the groupware client. The groupware client then returns the results of the search to the user at 320 (e.g. in a GUI).

As shown in FIG. 4C, other properties of the workflow object may be determined automatically or manually by the user. For example, a start time and end time may be selected, as well as a location of the meeting. Attendees (sometimes referred to as invitees) may also be invited by selecting the "invite attendees" tool 413.

At 322, the user selects a tool to save the time tracked object, along with its associated charge code. At 323, the groupware client locally saves the time tracked object, and its corresponding properties, e.g. date, charge code, attendees, etc.

If the user also selects to release the workflow object at 324, then the object is locally saved at 326 and the groupware client determines whether the client is online or offline. In one configuration, the groupware client automatically releases the workflow object when the object is saved at 322.

If the client is offline, then at 327, the client marks the workflow object for later synchronization with the backend. If the client is online, then the client transmits information related to the workflow object to the backend.

In one use, the client transmits the charge code, saved in association with the workflow object, to the business process server which determines whether the charge code is valid at 328. For example, in one configuration, a business application in the business process server includes a validation module connected to the groupware interface. The validation module is also connected to a database. In use, the validation module receives a project code from a groupware client via the groupware interface and determines the validity of the project code based on data stored in the database.

If the code is not valid, then the business process server communicates the error to the groupware server, which then notifies the user of the error via the groupware client. In one configuration, the business process server communicates the error using a notification module or an alert module. In one use, the groupware server transmits an email to the groupware client indicating the error. The groupware client then presents the email to the user at 332, possibly with a link to the workflow object with the invalid code.

If the code is valid, in one configuration, the business process server communicates to the groupware server that the code is valid. In response, in one configuration, the groupware server creates a calendar entry at 334 on the server that enables the user to view the workflow object in any client the user may log in to. The calendar entry is presented at 336 to the user when the user accesses the groupware client. In one configuration, the groupware server creates or edits another workflow object, such as a reminder object to automatically remind the user of the time-tracked object, e.g. when the meeting time is near.

In one configuration, the groupware server sends a confirmation that the time-tracked object includes valid information. The confirmation is received by the groupware client at 338.

Figure 6A:
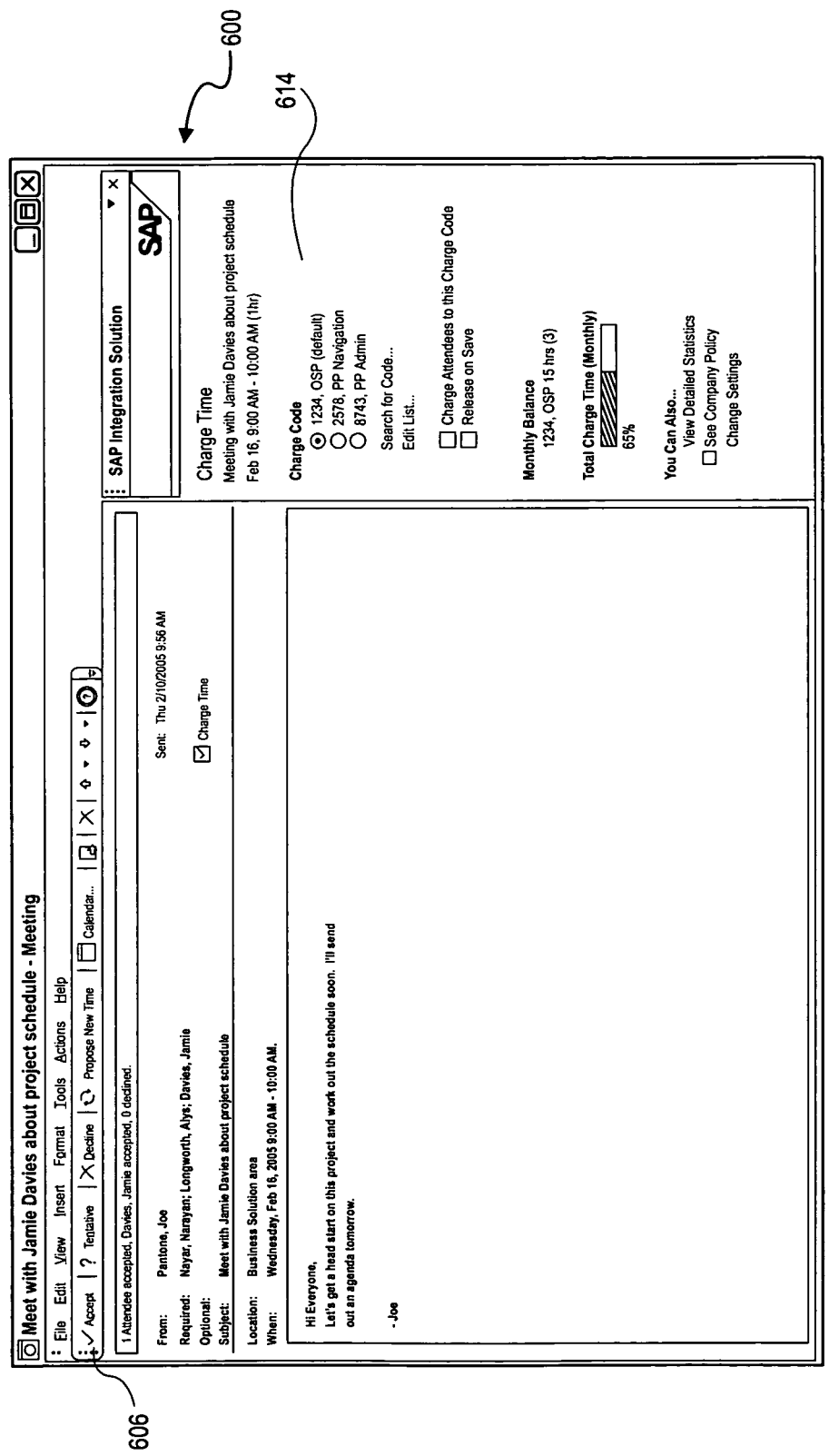
FIGS. 6a-6b are representations of a user interface in accordance with FIG. 5.
Figure 6B:
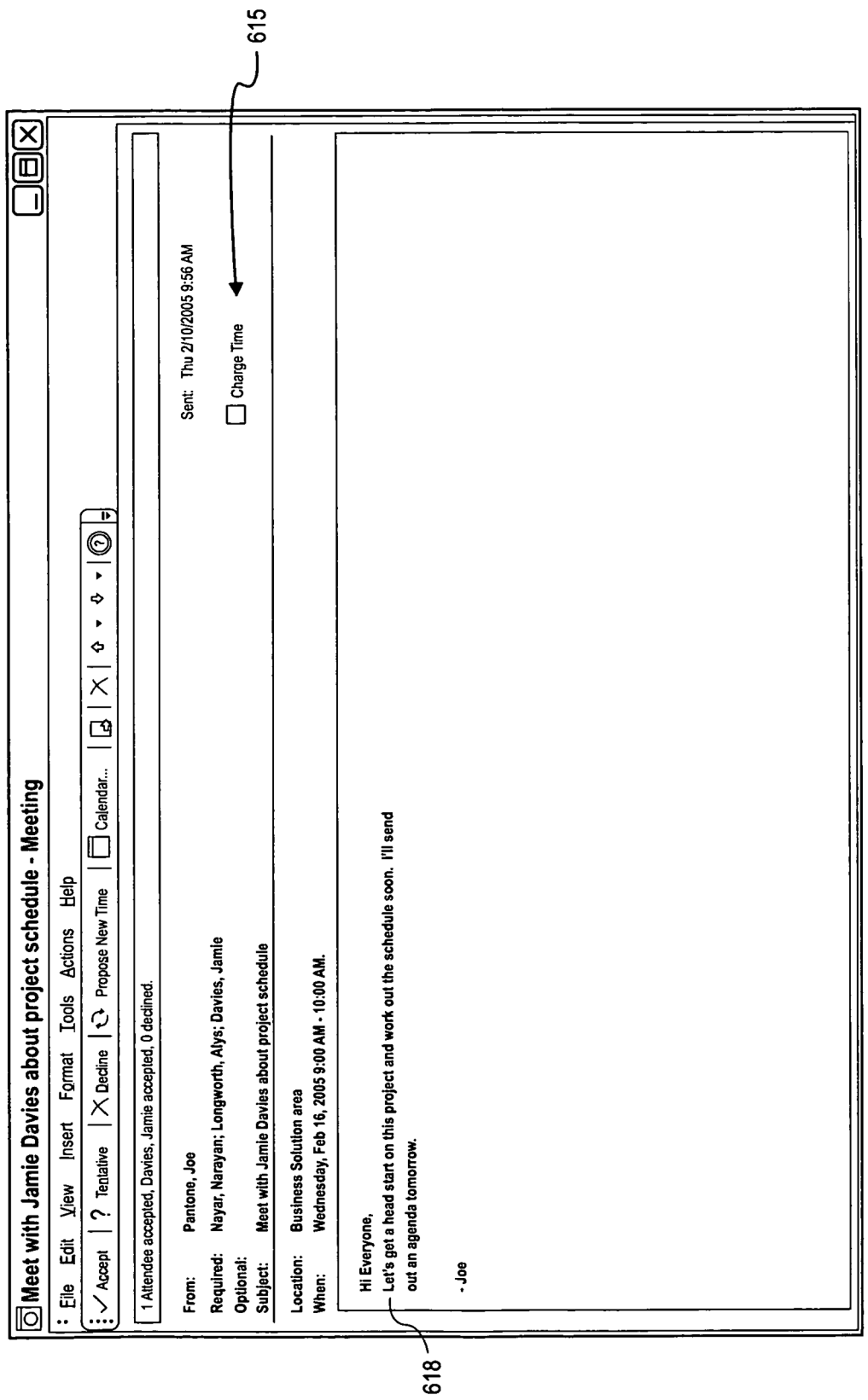

Additional operations occur if the workflow object is associated with more than one groupware client user. FIGS. 5 and 6A-B provide further details regarding notifying other groupware users of the object (208) and determining properties of the object (206) when a workflow object is associated with more than one groupware client user.

For example, when the user organizes a meeting for several workflow participants, the user invites the participants by selecting the "invite attendees" tool 413. In one use, this selection occurs after the user selects one or more dates at 302. As shown in FIG. 3, the flow diagram continues to FIG. 5 via A1. In FIG. 5, the user identifies other groupware users (e.g. groupware user 102B) to notify of the workflow object.

After the groupware server receives a confirmation that the charge code is valid, the flow diagram of FIG. 3 continues to FIG. 5 via A2 when the user 102A has identified other groupware users to associate with the workflow object.

At 504, the groupware server creates a notification of the workflow object and transmits the notification to the groupware users identified at 502. In one configuration, the notification is an email object, containing information about the properties of the workflow object. For example, a body of the email body may list the date, time, and location of the meeting and a To: header may list all the invitees. In one configuration, the notification is a workflow object which includes tools for accepting, tentatively accepting, declining, or proposing to modify properties of the workflow object. In one configuration, the workflow object created in a groupware client (e.g. 110A by the user 102A) and associated with a start time, an end time, and a project code designated by the organizer of the workflow task (e.g. the user 102A) is transmitted to another groupware client (e.g. 110B). Creating the workflow object in the groupware client 110A includes obtaining information (e.g. a start time, an end time, and a project code) using the groupware client 110A. The information is used to create a modified instance of the workflow object. The modified version is transmitted to the second groupware client 110B.

At 505, the notification is presented to the invitee (e.g. the user 102B) via the groupware client 110B. The notification presented to the user at 505 may be, for example, a GUI 600 representing the workflow object, as shown in FIG. 6A. The GUI 600 includes a toolbar 606 containing the tools which enable the invitee (e.g. the user 102B) to accept, tentatively accept, decline, or propose to a modification to the workflow object. This notification is viewed by the invitee (e.g. the user 102B) at 506. Accordingly, embodiments of the present invention enable the workflow object to be provided to a potential participant of a workflow task.

If the user rejects the invitation, the rejection is saved locally at 508 on the groupware client 110B. If the groupware client 110B is offline, the groupware client 110B marks the workflow object for synchronization at 509 with the groupware server when the groupware client 110B gains access to the groupware server. If the groupware client 110B is online, the groupware client 110B transmits the rejection to the backend. Accordingly, the backend receives from the groupware client 110B a response to the transmission of the workflow object created in the groupware client 110A to the groupware client 110B. The backend (typically the groupware server) relays the rejection at 510 to the groupware client 110A of user 102A.

At 512, the groupware client 110A of the user 102A indicates the rejection, e.g. by modifying the workflow object to show that the invited groupware user 102B has declined the invitation to join the meeting. For example, a status line, flag, or list of attendees associated with the workflow object may be modified.

If the user 102B decides to accept the invitation, the user 102B may also select to change the charge code at 514. The GUI 600 shown in FIG. 6A includes tools enabling the recipient of the workflow object (e.g. the user 102B) to alter the charge code associated with the time the user 102B spends on the task associated with the object. For example, although an organizer of the meeting (e.g. the user 102A) indicated that the time associated with the meeting is to be tracked and charged to a first code (e.g. "1234, OSP"), in certain implementations, the user 102B is enabled to change the charge code associated with the time the user 102B individually spends at the meeting (e.g. to "5600, F2 Adobe").

Accordingly, embodiments of the invention enable participants of a workflow task, e.g. attendees of a groupware event, to assign their time to the same code defined by an event organizer (e.g. the user 102A), or to a different code (e.g. determined by the attendee). As seen in FIG. 6A, the workflow object enables the invitee (e.g. the user 102B) to select from a list of codes, as well as to search for a code, similar to the tools provided to the user 102A described above.

When the groupware client, groupware server, and/or business process server receives a designation of a second project code (e.g. determined by the user 102B), the groupware client, groupware server, and/or business process server associates the second project code with the workflow object. In one implementation, the second project code is associated with the workflow object in association with an identifier of the user 102B. Accordingly, the user 102B's time is associated with the workflow object and the second project code, while the user 102A's time remains associated with the workflow object and the first project code.

In one configuration, the groupware client 110B also enables the user 102B to select to not charge to any charge code the time the user 102B individually spends in association with the workflow object. For example, in FIG. 6B, the user 102B selects the "Charge Time" checkbox 615. Because the checkbox was previously selected (as seen in FIG. 6A), the user 102B has effectively de-selected the time tracking tool. The time associated with the workflow object and the user 102B is no longer tracked or charged, but the time associated with the workflow object and another user (e.g. the user 102A) continues to be tracked and possibly charged.

As can be seen from FIG. 6B, once the time tracking tool (e.g. the "Charge Time" checkbox 615) is de-selected, the tools associated with time tracking, e.g. the charge code selectors, are not longer visible to the user 102B in the GUI representing the workflow task.

At 516, the groupware client saves the acceptance of the invitation to attend the meeting locally on the groupware client 110B. If the groupware client 110B is offline, the groupware client 110B marks at 517 the workflow object for synchronization with the groupware server when the groupware client 110B gains access to the groupware server.

If the groupware client 110B is online, the groupware client 110B transmits the acceptance to the groupware server. If the user 102B has changed the code, the groupware server communicates with the business process server to determine if the new code is valid at 328.

If the code is valid, then the acceptance is communicated to the groupware client 110A via the groupware server. In one configuration, the business process server communicates that the code is valid to the groupware server. The groupware server then generates a notification of the user 102B's acceptance of the invitation and transmits the notification to the groupware client 110A. At 522, the groupware client 110A indicates the acceptance to the user 102A, e.g. by displaying the notification in a GUI of the groupware client.

In certain configurations, in response to a valid charge code, the groupware server also creates a calendar entry at 334 and associates it with the user 102B. The groupware client 110B presents the calendar entry at 520, e.g. as an entry in a GUI similar to that shown in FIG. 4A. In one configuration, the groupware server (and/or business process server and/or groupware client) automatically creates a calendar entry based on the start time and the end time associated with the workflow object.

If the code is not valid, the business process server communicates the error to the groupware server, which then notifies the user of the error at 330. In one configuration, the groupware server notifies the user by transmitting an email to the groupware client 110B. At 518, the groupware client 110B presents the notification to the user. In one configuration, the business process server communicates the error directly to the groupware client 110B, bypassing the groupware server, e.g. via a service module. The notification is presented in a GUI of the groupware client 110B. In response to the error, the groupware client 110B enables the user to change the charge code, e.g. at 514.

Figure 7:
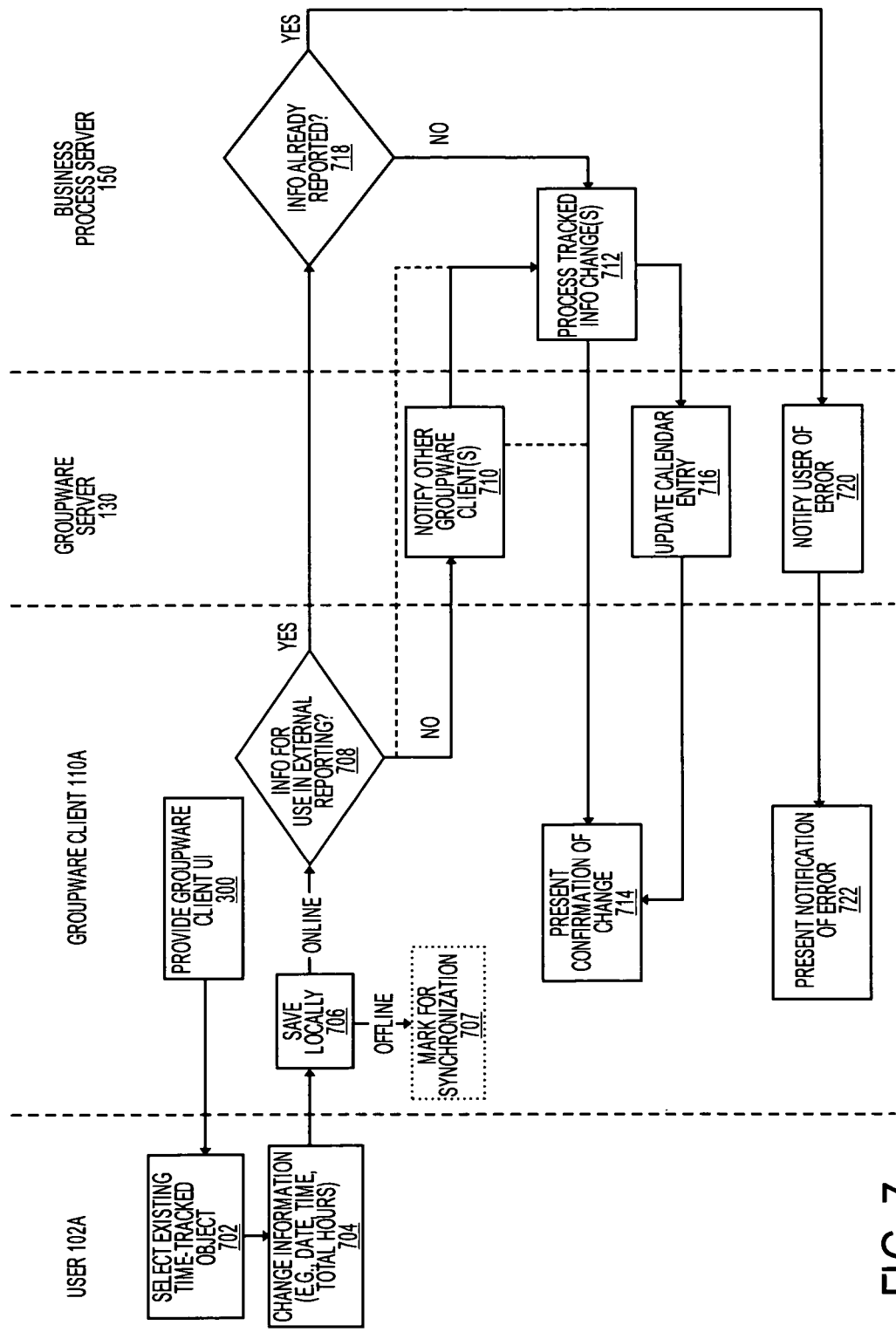
FIG. 7 is a flow diagram of further operations in accordance with FIG. 2.
Figure 8:
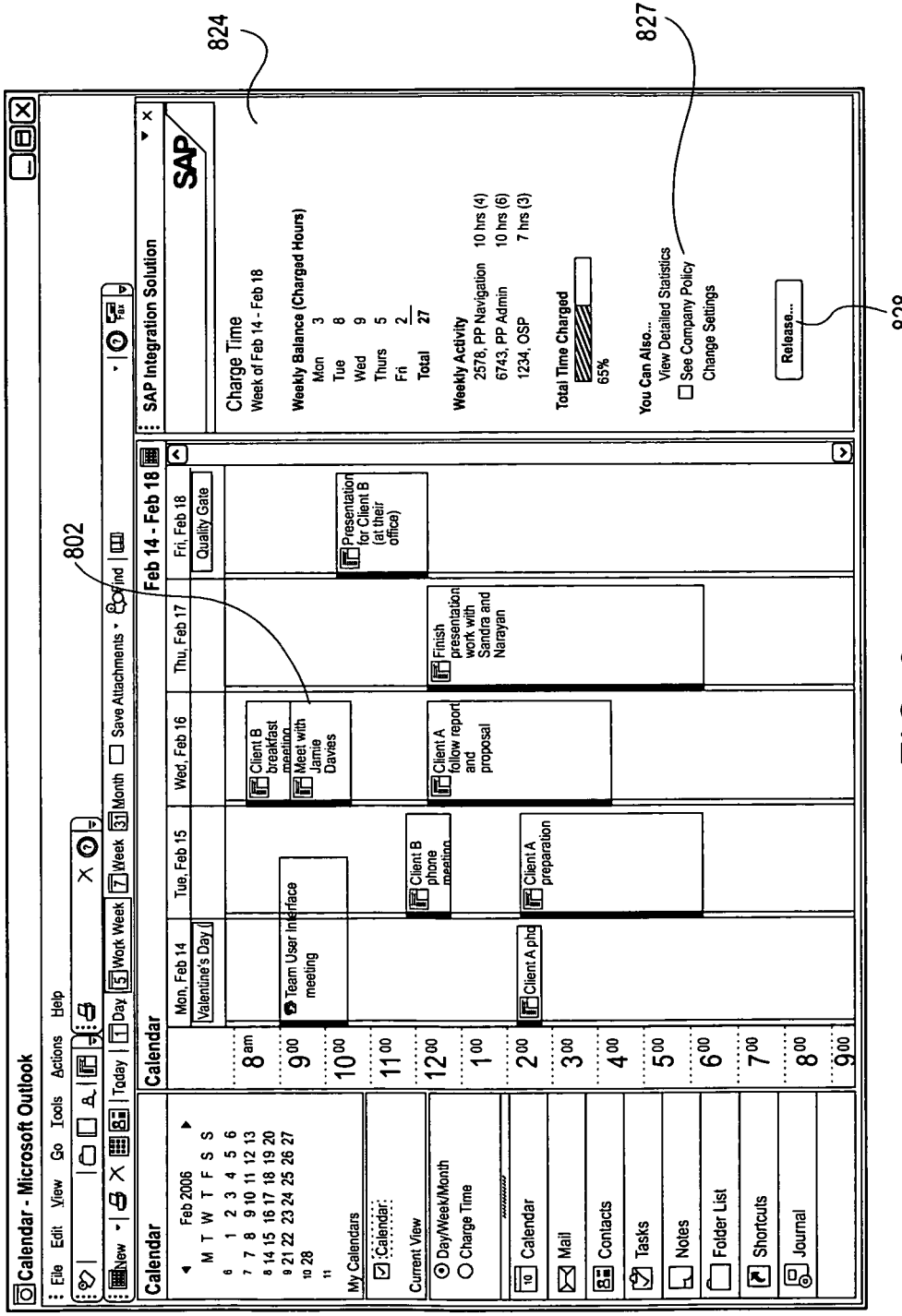
FIG. 8 is a representation of a user interface in accordance with FIG. 7.

FIGS. 7 and 8 provide details regarding operations which occur when properties of a workflow object are changed and when a task associated with the workflow object is complete.

In FIG. 7, the groupware client user interface is again provided at 300. At 702, a groupware client user (e.g. the user 102A), selects a time-tracked object, e.g. a calendar object represented as a calendar entry 802 in the GUI shown in FIG. 8. In response to the selection of the time-tracked object at 702, the groupware client provides a representation of the object. The representation may be the GUI shown in FIG. 4C if the user is an organizer of the groupware event (e.g. the user 102A), for example. The representation may also be the GUI shown in FIG. 6A if the user is an invitee of the groupware event (e.g. the user 102B), for example.

At 704, using the tools provided in the GUI, the user changes information related to the workflow object (e.g. properties of the workflow object). For example, the user may change a date, time or location of the groupware event (e.g. the meeting) associated with the workflow object. The user may also change a start time or an end time. Changing the start time and/or the end time affects the total time associated with the workflow task.

At 706, the updated information is saved locally (e.g. in a hard drive of a machine executing the groupware client). If the client is offline, then at 707, the client marks the workflow object for later synchronization with the backend.

If the client is online, then at 708, the client determines if the changed information relates to information which is used in an external report (e.g. in an invoice to a customer). Information which relates to information which is used in an external report include, for example, a charge code associated with the workflow object, a total time associated with the workflow object, a date of the groupware event being managed by the workflow object, and attendees of the groupware events. Information which may not relate to information which is used in an external report include, for example, text describing the groupware event such as the text 618 shown in FIG. 6B, a change in the starting and ending time but not in the total time, and, in many scenarios, a change in location.

If the changed information does not relate to information which is used in an external report, the groupware client transmits the information to the groupware server. If the workflow object is associated with other groupware users, the groupware server notifies at 710 the other groupware users of the change via respective groupware clients.

The changed information is also communicated to the business process server where the business process server can process the changes to the tracked information at 712. In one configuration, the processing includes using a storage interface included in a backend application of the business process server. When the changed property of the workflow object has not been incorporated into the external report, the storage interface transmits the property to a storage system (e.g. the database 160) for storage. After processing, the backend communicates to the groupware client that the change is received.

In one configuration, the business process server processes the information by updating the database 160 with the new information. In one configuration, the data is used to generate dynamic internal reports to other groupware users. For example, in one configuration, the data is used to calculate summaries which are presented to a groupware user, including groupware users who not associated with the workflow task directly, but are associated with the charge code (e.g. a supervisor).

In FIG. 8, a region 824 includes a summary of charged time associated with one or more charge codes (e.g. 1234, OSP) and one or more time periods (e.g. Monday or weekly balance total). It shall be appreciated that the summary may be presented in other formats and remain within the scope of this invention. The summary enables workflow participants using a groupware client to review their charged time. This facilitates compliance with a time tracking policy, e.g. determined by the enterprise and viewable using the tool 827. In one configuration, when a time tracking policy is not being complied with, an alert module (e.g. in a backend application) transmits to one or more groupware clients an alert. The alert may be based on a time. For example, the alert may be based on time which has been associated with a charge code but not released to the backend application for external reporting.

In FIG. 8, the summary region includes a release tool 828. The release tool enables the user to release the information in the summary to the backend application, e.g. to an accounting program in the business process server. In one configuration, when the user releases the information, the backend application uses the information to generate an invoice based on the associated data.

At 714, the groupware client presents confirmation of the change to the user. For example, the groupware client may change a status of an associated calendar entry (e.g. changing a textual status, a flag, or a color scheme) or place an email in the user's inbox to present confirmation of the change to the user.

At 716, if the changed information alters a calendar entry (e.g. changes a date or time), the groupware server also updates the calendar entry. This update is propagated to the groupware client when the client synchronizes with the server.

When the changed information relates to information which is used in an external report, the groupware client transmits the information to the business process server. At 718, the business process server determines if the information was already reported externally. For example, if the meeting took place in the past, the business process server determines if the time was already included in an invoice sent to customer.

If the information was not already reported externally (e.g. because the meeting is still pending or because the billing cycle has not completed), then the change is processed at 712 as described above. If the change (e.g. a change to the charge code) was already reported (e.g. already invoiced to a customer assigned to the original charge code), then the business process server notifies the user of the error. For example, in one configuration, the business process server includes a backend application including a notification module. The notification module transmits an error message to the groupware client in response to the request to change the property of the workflow if the property was incorporated into the external report. In one configuration, the business process server communicates the error to the groupware server. The groupware server notifies the user of the error at 720, e.g. by transmitting an email to an appropriate groupware client.

At 722, the groupware client presents the error to the user. The groupware client enables the user to change at 704 the information appropriately.

In certain embodiments, operations described herein are performed when a machine readable medium having instructions are executed by a processor. A machine readable medium includes any mechanism that stores and/or transmits information/content/instructions in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for tracking time associated with a workflow task, the method comprising:
a groupware client application accessing a service of one or more backend applications of a backend server through a groupware server, the accessing via a network interface of the groupware client application coupled to the groupware server, the one or more backend applications of the backend server communicating with the groupware server via a groupware interface of the backend server;
providing in a graphical user interface of the groupware client application a workflow object representing a workflow task;
associating with the workflow object a time period, a project code, and an identifier of a groupware client application user participating in the workflow task;
in response to an event indicating completion of the workflow task, automatically bypassing the groupware server in communicating from the groupware client application to the backend server, the bypassing including transmitting information to a backend application of the backend server through a business process client extension of the groupware client application, the business process client extension distinct from the network interface, wherein the transmitting information to the backend application is independent of the network interface of the groupware client application coupled to the groupware server, the information including the time period, the project code, and the identifier; and
with the business process client extension, integrating business process tasks into the graphical user interface of the groupware client application, the integrating enabling the groupware client application user to act on enterprise information from within the graphical user interface.

2. The method of claim 1, further comprising:
calculating the time period based on input indicating a start time and an end time.

3. The method of claim 2, wherein the event occurs when a current time is equal to the end time and the method further comprises:
comparing the current time with the end time.

4. The method of claim 1, wherein the event occurs when a graphical user interface tool in the groupware client application is selected and the method further comprises:
receiving input indicating selection of the tool.

5. The method of claim 1, further comprising:
receiving from the backend application a summary of time periods associated with the project code or the identifier; and
presenting the summary in the groupware client application.

6. The method of claim 1, further comprising:
providing a list of project codes based on the identifier; and
enabling the user to select the project code from the list.

7. The method of claim 1, further comprising:
enabling the user to search for the project code.

8. The method of claim 1, wherein providing the workflow object comprises providing the workflow object to a potential participant of the workflow task.

9. A non-transitory machine readable storage medium having stored thereon instructions which when executed by a processor cause a backend server to perform operations comprising:
providing a service of one or more backend applications to a first groupware client application through a groupware server, the providing via a network interface of the first groupware client application coupled to the groupware server, the one or more backend applications of the backend server communicating with the groupware server via a groupware interface of the backend server;
transmitting to the first groupware client application a workflow object representing a workflow task, the workflow object created in a second groupware client application and associated with a start time, an end time, and a project code designated by an organizer of the workflow task;
receiving from the first groupware client application a response to the transmitting, the response received via a business process client extension of the first groupware client application distinct from the network interface, the first groupware client application sending the response through the business process client extension to bypass the groupware server in communicating from the first groupware client application to the backend server, wherein the business process client extension integrates business process tasks into a graphical user interface of the first groupware client application, the integrating enabling a user of the first groupware client application to act on enterprise information from within the graphical user interface;
relaying the response to the second groupware client application; and
when the response includes an acceptance of participation in the workflow task, automatically creating in the first groupware client application a calendar entry based on the start time and the end time.

10. The storage medium of claim 9, wherein the operations further comprise:
receiving a designation of a second project code; and
associating the second project code with the workflow object.

11. The storage medium of claim 10, wherein receiving the designation comprises receiving the designation from the first groupware client application, and the operations further comprise:
associating the second project code with the workflow object in association with an identifier of a user of the first groupware client application.

12. The storage medium of claim 9, wherein the workflow object is selected from the group consisting of: a calendar object, an email object, a task list object, and a contacts object.

13. A device for processing time associated with a workflow task comprising:
a groupware interface to communicate with a groupware server, the groupware interface to receive, from a groupware client application, a request to change a property of a workflow object representing a workflow task, the workflow object associated with a time, a project code, and one or more user identifiers, the request received via a business process client extension of the groupware client application distinct from a network interface of the groupware client application, the groupware client application sending the request through the business process client extension to bypass the groupware server in communicating from the groupware client application to the device, wherein the business process client extension integrates business process tasks into a graphical user interface of the groupware client application, the integrating enabling a groupware client application user to act on enterprise information from within the graphical user interface; and
one or more backend applications executed by a processor and a memory, the one or more backend applications connected to the groupware interface to provide the network interface of the groupware client application with access to a service, the providing access through the groupware server, the one or more backend applications including a first backend application, comprising:

a reporting module to determine if the property was incorporated into an external report;

a storage interface to transmit the property to a storage system in response to the request if the property was not incorporated into the external report; and a notification module to transmit an error message to the groupware client application in response to the request if the property was incorporated into the external report.

14. The device of claim 13, wherein the external report comprises an invoice.

15. The device of claim 13, wherein the reporting module comprises:

an internal reporting module connected to the groupware interface to generate an internal report summarizing times associated with the project code or associated with at least one of the one or more user identifiers.

16. The device of claim 13, wherein the reporting module comprises:

an external reporting module connected to an external system to generate the external report based on the time, the project code, and the one or more user identifiers.

17. The device of claim 13, wherein the backend application further comprises:

an alert module to transmit to one or more groupware client applications an alert based on the time, the alert relating to compliance with a time tracking policy.

18. The device of claim 13, wherein the backend application further comprises:

a validation module connected to the groupware interface and a database to receive project codes from the groupware client application via the groupware interface and to determine validity of the project codes based on data stored in the database.

19. The device of claim 13, wherein the backend application further comprises:

a default module to provide a default project code to associate with the workflow object, the default project code based on at least one of: the workflow task, the time, and the one or more user identifiers.

20. The device of claim 13, wherein the backend application further comprises:

a default module to provide a default time to associate with the workflow object, the default time based on at least one of:

the workflow task, the project code, the one or more user identifiers, or a status of a project assigned to the project code.

* * * * *